US012612002B2

(12) United States Patent
Bader et al.

(10) Patent No.: US 12,612,002 B2
(45) Date of Patent: Apr. 28, 2026

(54) MODULAR PUSH BUMPER

(71) Applicant: Federal Signal Corporation, Oak Brook, IL (US)

(72) Inventors: Joseph F. Bader, Monee, IL (US); Mitchell A. Dolak, Joliet, IL (US)

(73) Assignee: Federal Signal Corporation, Downers Grove, IL (US)

( * ) Notice: Subject to any disclaimer, the term of this patent is extended or adjusted under 35 U.S.C. 154(b) by 391 days.

(21) Appl. No.: 18/326,075

(22) Filed: May 31, 2023

(65) Prior Publication Data

US 2024/0051482 A1    Feb. 15, 2024

Related U.S. Application Data

(60) Provisional application No. 63/396,996, filed on Aug. 11, 2022.

(51) Int. Cl.
| | |
|---|---|
| *B60R 19/50* | (2006.01) |
| *B60Q 5/00* | (2006.01) |
| *B60R 19/02* | (2006.01) |
| *B60R 19/24* | (2006.01) |

(52) U.S. Cl.
CPC ............... *B60R 19/50* (2013.01); *B60Q 5/00* (2013.01); *B60R 19/023* (2013.01); *B60R 19/24* (2013.01); *B60R 2019/505* (2013.01)

(58) Field of Classification Search
CPC ... B60R 19/50; B60R 19/24; B60R 2019/505; B60R 19/023; B60R 19/02
See application file for complete search history.

(56) References Cited

U.S. PATENT DOCUMENTS

| | | | | |
|---|---|---|---|---|
| 5,215,343 | A  * | 6/1993 | Fortune | B60R 19/52 |
| | | | | 293/121 |
| 6,315,338 | B1 * | 11/2001 | Schneider | B60R 19/52 |
| | | | | 293/115 |
| 6,979,016 | B1 * | 12/2005 | Wegener | B60D 1/56 |
| | | | | 280/495 |
| 9,283,887 | B1 | 3/2016 | Carpenter et al. | |
| D755,094 | S | 5/2016 | Lanini | |
| 9,499,095 | B1 | 11/2016 | Buehler et al. | |
| 9,725,031 | B2 | 8/2017 | Carpenter et al. | |
| 9,751,457 | B1 | 9/2017 | Buehler et al. | |
| 9,884,600 | B2 * | 2/2018 | Fujimoto | B60R 19/44 |
| 10,315,599 | B2 * | 6/2019 | Yang | B60Q 1/2661 |
| 2009/0110224 | A1 * | 4/2009 | Tobin | B60Q 5/00 |
| | | | | 381/340 |
| 2013/0134724 | A1 * | 5/2013 | Fisher | B60R 19/44 |
| | | | | 293/142 |

(Continued)

OTHER PUBLICATIONS

M9042/0222—PBX Series Bumper Data Sheet, Federal Signal Corporation, 2021 (2 pages).

(Continued)

*Primary Examiner* — Taras P Bemko
(74) *Attorney, Agent, or Firm* — Merchant & Gould P.C.

(57) ABSTRACT

A modular push bumper that mounts directly to a chassis or frame of a vehicle. Members of the push bumper are fastened together with fasteners, rather than welded together. The modular push bumper can include a channel member defining a channel for mounting accessories to the modular push bumper. The channel member is configured to block access to the accessory.

9 Claims, 5 Drawing Sheets

(56) References Cited

U.S. PATENT DOCUMENTS

2023/0069186 A1 * 3/2023 Colgan-Smith ......... B60Q 1/20

OTHER PUBLICATIONS

Federal Signal Safety and Security Systems—PBXW-TAH15 and PBXW-FRD15 Wing Wrap Kits—"Safety Message to Installers and Service Personnel of Emergency Vehicle Safety Equipment," Installing Wing Wrap PBXW-TAH15 on the 2015+ Chevy Tahoe or PBXW-FRD15 on the 2015+ Ford F-150, admitted as prior art as of Aug. 11, 2022 (4 pages).
Marketing Update—Federal Signal—MU620 Additions to PBX Series, Jun. 1, 2016 (2 pages).
Federal Signal Safety and Security Systems—PBXW-FPIU20 Wing Wrap Ford Police Interceptor Utility 2020+, 25500632 Rev. A0 0320, 2020 (4 pages).

* cited by examiner

MODULAR PUSH BUMPER

BACKGROUND

Push bumpers are used on vehicles to reduce damage to the vehicle in the event of a collision. Push bumpers are also used to mount accessories such as lights, sirens and speakers to help increase the visibility and presence of the vehicle, such as a police car or other emergency vehicle.

SUMMARY

In general terms, the present disclosure is directed to a modular push bumper. The modular push bumper is mountable directly to a vehicle and includes bumper members that are assembled with fasteners.

In further general terms, the present disclosure is directed to a vehicle to which a modular push bumper is directly mounted.

In further general terms, the present disclosure is directed to a method of assembling a push bumper by fastening together, with fasteners, push bumper members, including at least one push bumper member configured to be mounted directly to a frame or a chassis of a vehicle.

In further general terms, the present disclosure is directed to a push bumper including a channel defining a mounting location for an accessory to be mounted to the push bumper within the channel.

According to certain aspects of the present disclosure, a modular push bumper for a vehicle, includes: a plurality of modules configured to be fastened together and to the vehicle.

According to further aspects of the present disclosure, a push bumper assembly kit for a vehicle, includes: a push bumper having a front and a back, the back of the push bumper being configured to be mounted directly to a chassis or a frame of the vehicle, the push bumper including a channel member defining a channel; and an accessory mounted in the channel such that access to the accessory from the front of the bumper is blocked by the channel member.

According to certain aspects of the present disclosure, a push bumper assembly for a vehicle includes: bumper members, including at least two uprights and at least one crossbar, at least one of the bumper members being configured to mount directly to a frame or to a chassis of the vehicle; and fasteners configured to fasten the bumper members together and to fasten the at least one of the bumper members to the frame or to the chassis.

According to further aspects of the present disclosure, a push bumper assembly for a vehicle includes: a push bumper having a front and a back, the back of the push bumper being configured to be mounted to a chassis or to a frame of the vehicle, the push bumper including a channel member defining a channel, and an accessory mounted in the channel such that access to the accessory from the front of the bumper is blocked by the channel member.

According to further aspects of the present disclosure, a push bumper assembly for a vehicle, includes: bumper members, including at least two uprights and at least one crossbar, at least one of the bumper members being configured to mount directly to a frame or to a chassis of the vehicle at a front of the vehicle; and fasteners configured to fasten the bumper members together to form a push bumper having a front and a back, the back facing the front of the vehicle when the push bumper is mounted to the vehicle, the fasteners being further configured to fasten the at least one of the bumper members to the frame or the chassis, one of the bumper members including a channel member defining a channel; and an accessory mounted in the channel such that access to the accessory from the front of the bumper is blocked by the channel member.

According to further aspects of the present disclosure, a method of mounting a push bumper to a vehicle, includes: (a) fastening, with first fasteners, brackets to a frame or a chassis of the vehicle; (b) after (a), fastening, with second fasteners first bumper members to the brackets; and (c) after (b), fastening, with third fasteners, second bumper members to the first bumper members.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure as claimed.

DESCRIPTION OF THE DRAWINGS

The following figures, which form a part of this application, are illustrative of described technology and are not meant to limit the scope of the disclosure as claimed in any manner, which scope shall be based on the claims appended hereto.

DETAILED DESCRIPTION

Figure 1:
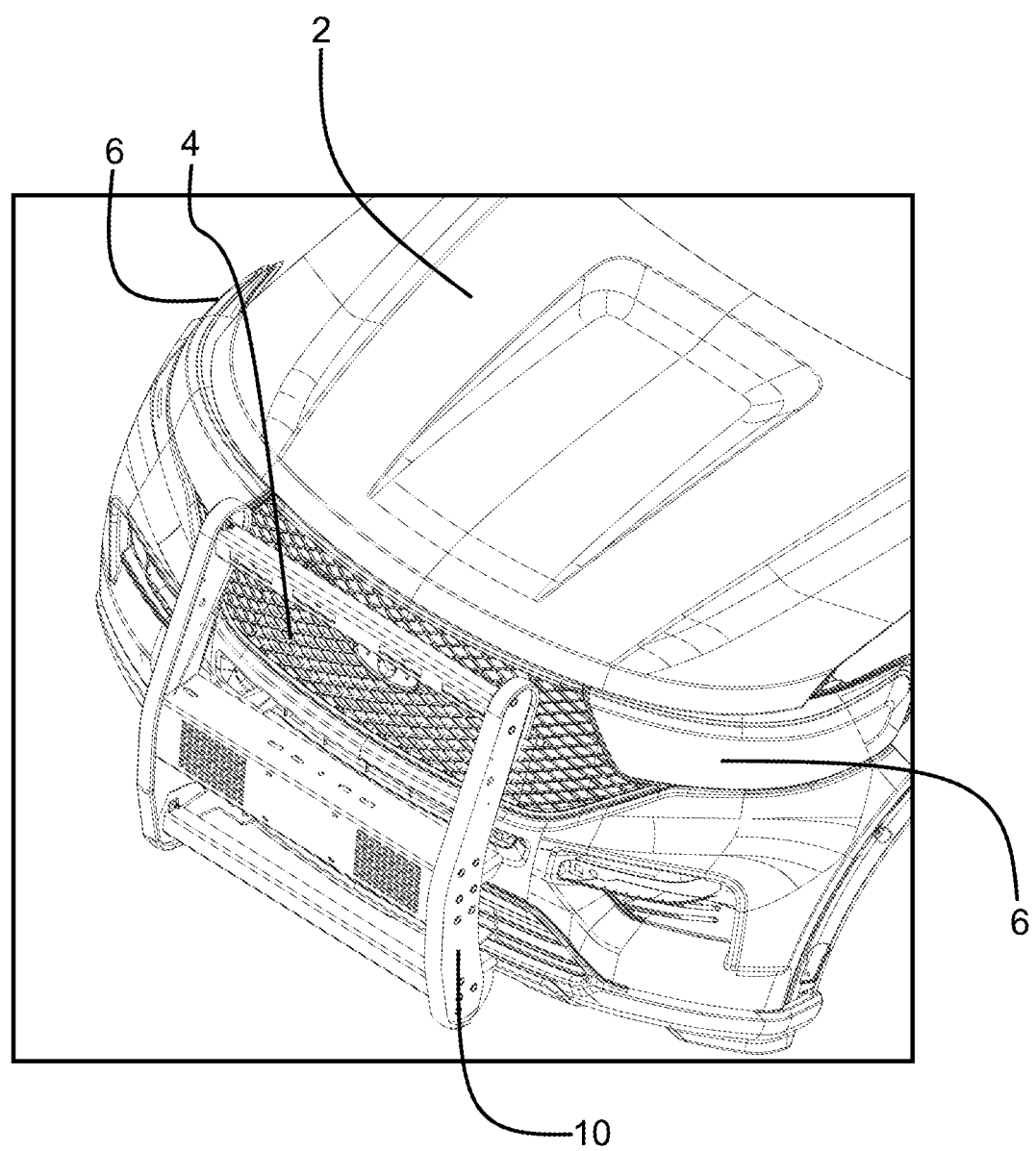
FIG. 1 is a perspective view of a portion of a vehicle and an example push bumper according to the present disclosure mounted to the vehicle.

Various embodiments of the present inventions will be described in detail with reference to the drawings, wherein like reference numerals represent like parts and assemblies throughout the several views. Reference to various embodiments does not limit the scope of the inventions, which are limited only by the scope of the claims attached hereto. Additionally, any examples set forth in this specification are not intended to be limiting and merely set forth some of the many possible embodiments for the claimed inventions.

Push bumpers are typically mounted at the front of vehicles to absorb impact for additional protection in the event of a collision. For certain types of vehicles (e.g., emergency vehicles, park ranger vehicles, and the like), accessories, such as lights, speakers, reflectors, and sirens can be mounted to the push bumper to increase awareness of the vehicle by pedestrians, other vehicles, animals, and so forth. Some of these accessories can also be used to communicate from inside the vehicle to individuals outside the vehicle.

Typically, the main components of push bumpers are welded together, forming a unitarily integrated, single rigid piece. However, there can be drawbacks to a welded push bumper. The welding process is labor intensive, taking significant time and requiring multiple workers. In addition, over time, there is a tendency for the welds to rust, negatively impacting the strength and functionality of the bumper. In addition, because welding cannot typically be performed by the end user of the push bumper, push bumpers are typically welded at the factory and shipped as a single, unitarily integrated piece to the end user. The shape and size of a push bumper is awkward for shipping, requiring an over-sized box having wasted unused space to accommodate the bumper for shipping. Similarly, welded push bumpers are difficult to store and move around within a storage facility or distribution facility, due to their weight and size. These factors can dramatically increase the cost of the product. Furthermore, if the vehicle has a collision that damages a welded push bumper, or the push bumper rusts at a weld, any repair or replacement of the push bumper disadvantageously requires removal of the entire push bumper from the vehicle. Customization to specific vehicle types is also challenging with welded push bumpers since, once the push bumper is welded together for a given vehicle type, it becomes difficult to adapt it for another vehicle type.

Some push bumpers can accommodate accessories, such as speakers. However, when mounted to the push bumper, the accessory tends to be exposed to the elements and accessible from the front of the push bumper, which can result in damage to the accessory by weather, by vandalism, and/or lead to an increased likelihood of damage to the accessory in the event of a collision.

The present disclosure is directed to a modular push bumper, or push bumper assembly, that can overcome one or more of these drawbacks relating to welded push bumpers. The present disclosure is further directed to a push bumper assembly that can overcome one or more of these drawbacks relating to exposure of accessories mounted to push bumpers.

Modular push bumper assemblies according to the present disclosure can be stored and shipped unassembled as a kit, reducing packaging cost and size, and reducing shipping cost.

Modular push bumper assemblies according to the present disclosure can be assembled by the end user, module by module (e.g., bumper member by bumper member), directly onto a vehicle, and by a single worker.

Modular push bumper assemblies according to the present disclosure can be easily customized to different vehicle types and configurations by simply swapping one or more bumper members of the assembly with other members that are configured for a different vehicle type or different vehicle size.

Modular push bumper assemblies according to the present disclosure can be repaired or replaced without having to remove the entire assembly as a unit from the vehicle; rather, individual frame members can be removed, and/or only frame members that have been damaged can be removed.

Push bumpers according to the present disclosure can be configured to mount accessories such that exposure of the accessories to the elements is minimized and/or access to the accessories from a front of the push bumper is blocked by a portion of the push bumper, thereby minimizing risk of vandalism or other damage to the accessories. Mounting an accessory to a push bumper with protection being provided to the accessory by the push bumper can also be advantageous over mounting the accessory behind the facia of the vehicle, in that replacing or servicing the accessory, unlike when it is mounted behind the fascia, does not require removal of the fascia and removal of the push bumper, thereby reducing the complexity and labor required to repair, replace, or service the accessory, and reducing the amount of time the vehicle is out of commission to perform such work on the accessory.

FIG. 1 is a perspective view of a front portion of a vehicle 2 and an example push bumper 10 according to the present disclosure, the push bumper being mounted to the vehicle.

The vehicle can be any type of vehicle, including but not limited to an emergency vehicle (e.g., a police car, an ambulance, a fire truck), or a non-emergency vehicle (e.g., a truck, a park ranger vehicle). The vehicle 2 includes a chassis and/or a frame. The push bumper 10 is mounted to the chassis and/or the frame of the vehicle 2 at the front of the vehicle 2, e.g., in front of the grille 4 of the vehicle 2 and between the headlights 6 of the vehicle 2.

In other examples, the push bumper 10 can be mounted to the chassis and/or the frame of the vehicle at another part of the vehicle, e.g., at the rear of the vehicle. Orientational terms, such as front, back, forward, rear, rearward, upper, lower, top, bottom, and so forth, are used for ease of understanding of how components of a push bumper may be positioned relative to one another and relative to a vehicle. These orientational terms are not intended to limit where the push bumper can be mounted to a vehicle in practice.

Figure 2:
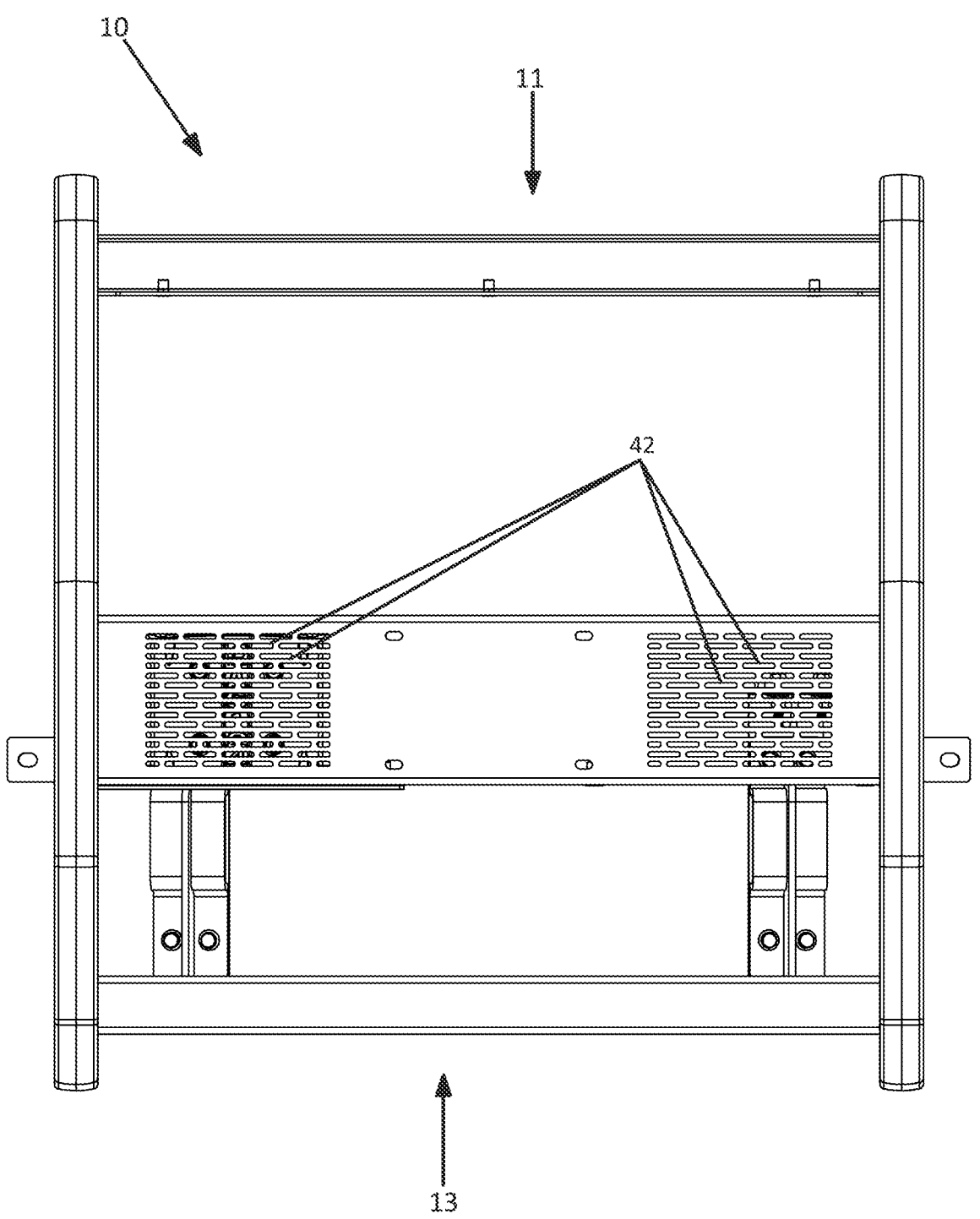
FIG. 2 is a front view of the push bumper of FIG. 1.
Figure 3:
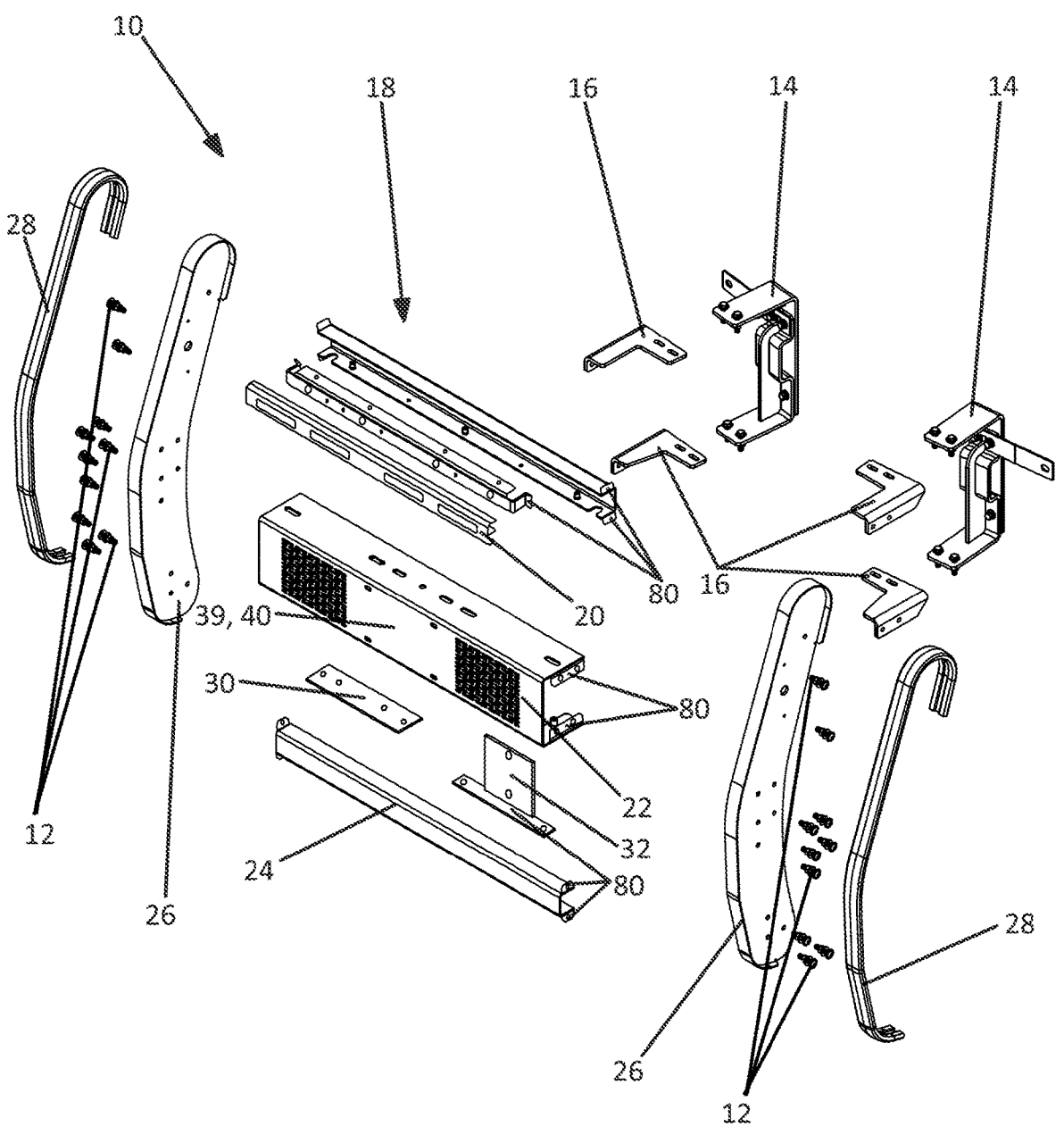
FIG. 3 is an exploded view of the push bumper of FIG. 1.
Figure 4:
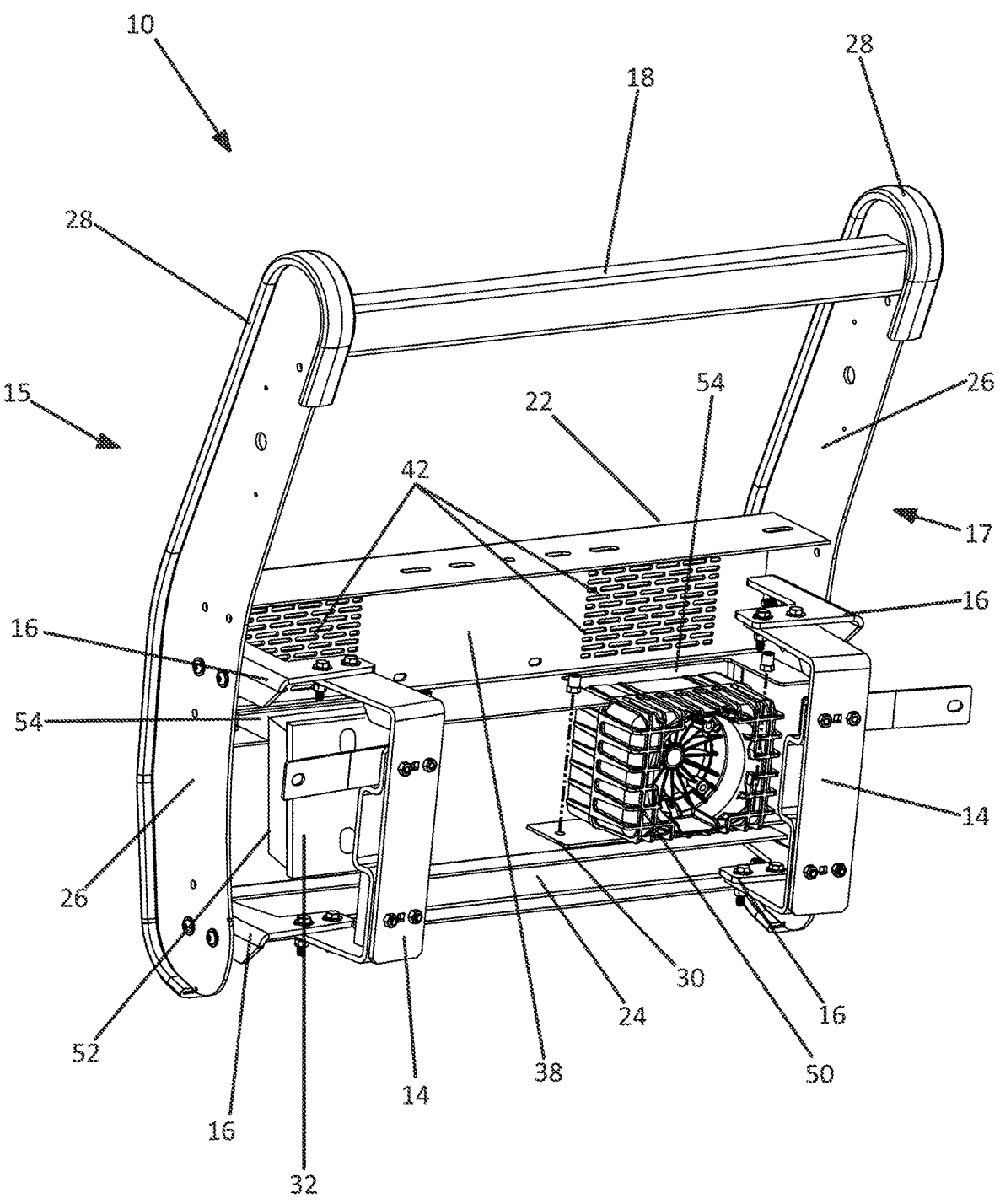
FIG. 4 is a perspective view of the push bumper of FIG. 1, and including uninstalled bumper accessories.
Figure 5:
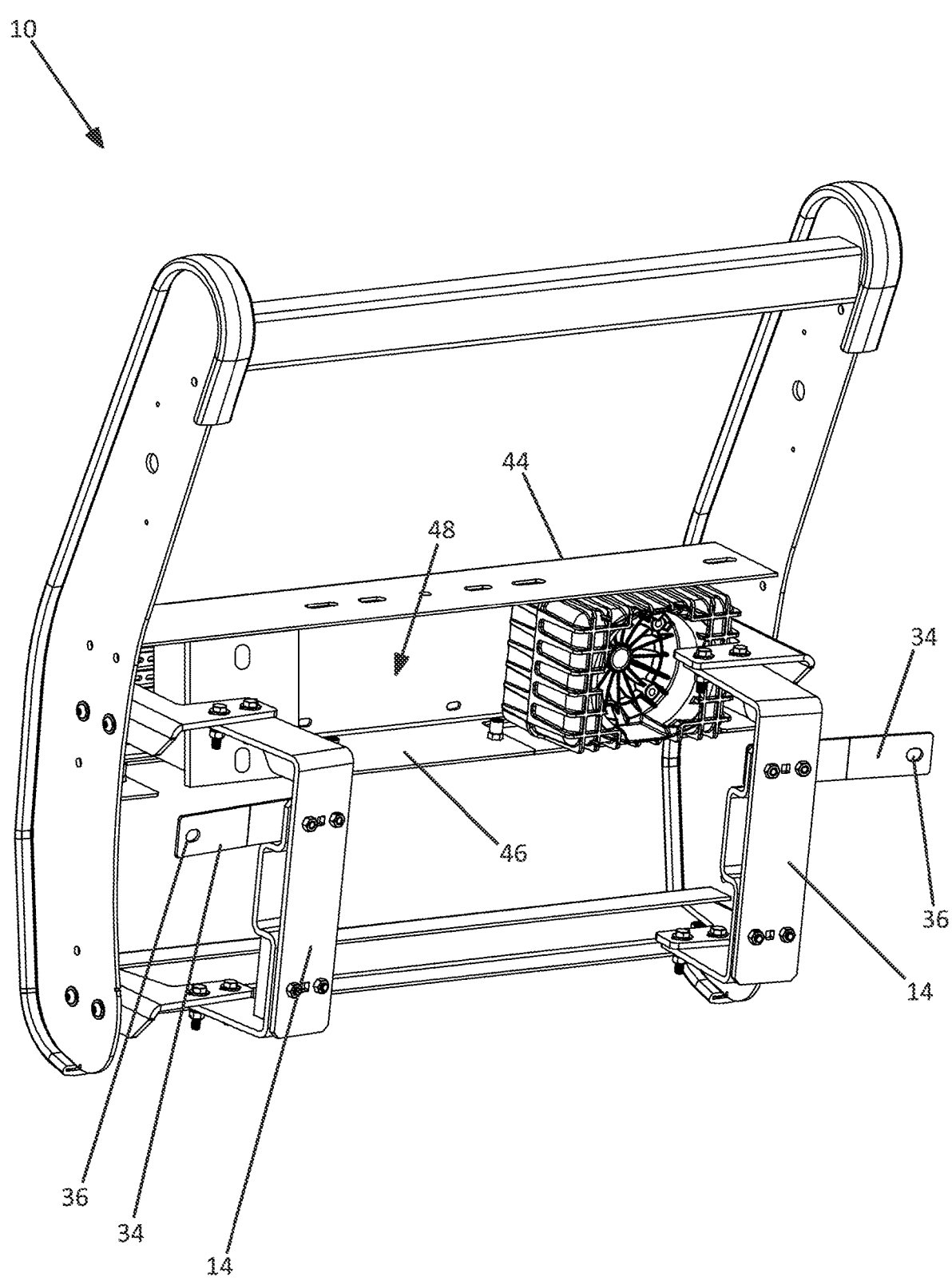
FIG. 5 is a perspective of the push bumper of FIG. 1, and including fully installed bumper accessories.

FIG. 2 is a front view of the push bumper 10 of FIG. 1. FIG. 3 is an exploded view of the push bumper 10 of FIG. 1. FIG. 4 is a perspective view of the push bumper 10 of FIG. 1, and including uninstalled bumper accessories. FIG. 5 is a perspective of the push bumper of FIG. 1, and including fully installed bumper accessories.

Referring to FIGS. 2-5, the bumper 10 extends from a top 11 to a bottom 13 of the bumper, and from a front 15 to a back 17 of the bumper.

The bumper 10 is an assembly of bumper members that are fastened together with fasteners 12. The fasteners 12 can include any suitable fasteners that can be installed and removed repeatedly without damaging the bumper members so that, for example, parts of the assembly can be assembled, disassembled and re-assembled one or more times. Non-limiting examples of the fasteners include threaded fasteners (e.g., screws, bolts, nuts), lock pins, and so forth. The fasteners 12 can include fasteners of different sizes and/or different configurations.

The bumper members of the assembly include mounting brackets 14 and supports 16. The bumper members of the assembly include crossbars including an upper crossbar assembly 18 that can include an accessory channel 20, a middle channel piece 22 and a lower channel 24. The bumper members can include uprights 26. The bumper members can include collision guards 28 (e.g., constructed from elastomeric material) that mount to front surface of the uprights 26. The bumper members can include accessory mounts 30 and 32 for mounting accessories to the middle channel piece 22. Other than the guards 28, the bumper members each can be constructed of a strong, rigid metal and machined to include holes for receiving the fasteners 12.

The brackets 14 include flanges 34 defining through holes 36. Fasteners can be inserted through the through holes 36 and into the chassis or frame of the vehicle to mount the brackets 14 to the vehicle. The flanges 34 can be of unitary construction with the brackets 14, or, alternatively, fastened thereto with fasteners. The brackets can be customized for specific vehicle types and configurations. For example, the size and configuration of the brackets can vary from vehicle to vehicle, while other bumper members are standard across multiple vehicle types.

Once the brackets 14 are mounted to the vehicle, the supports 16 can be mounted to the brackets 14 with fasteners 12.

Once the supports 16 are mounted to the brackets 14, the uprights 26 can be mounted to the supports 16 with fasteners 12. The uprights 26 can be customized for specific vehicle types and configurations. For example, the size and configuration of the uprights can vary from vehicle to vehicle, while other bumper members are standard across multiple vehicle types.

Once the uprights 26 are mounted to the supports 16, the upper channel assembly 18, the middle channel 22, and the lower channel 24 can be mounted to the uprights 26 with fasteners 12. One or more of these channels can be customized for specific vehicle types and configurations. For example, the size and configuration of one or more of the channels or channel assemblies can vary from vehicle to vehicle, while other bumper members are standard across multiple vehicle types.

The guards 28 can be mounted to the uprights 26.

Accessories can be mounted to the middle channel piece 22 with accessory mounts 30 and 32, using fasteners 12. The accessory mounts 30, 32 include plates that support accessories 50, 52 and can be mounted to the middle channel piece 22 with fasteners 12. The plates can be constructed of the same material as the middle channel piece 22.

The various parts of the assembly can be assembled in a different order than the one described above.

The middle channel piece 22 can be configured to accommodate one or more bumper accessories. The middle channel piece 22 includes a front wall 39 having a front-facing surface 40 and a back facing surface 38. The middle channel piece 22 also includes a top wall 44 and a bottom wall 46. The walls 39, 44 and 46 define a channel 48 that can receive bumper accessories, such as speakers 50 and 52. The speakers can be operatively connected to one or more of a speaker switch, a microphone and/or a speaker controller within the vehicle.

The accessory mounts 30 and 32 are configured to have accessories mounted thereto. The accessory mounts 30 and 32 are configured to mount, e.g., with fasteners 12, directly to the bottom wall 46. The bottom wall 46 defines cutouts or openings 54 that allow accessories to be upwardly installed into the channel piece 22 to mount them to the channel piece 22 using the accessory mounts 30 and 32.

Through holes 42 are provided through the wall 39 between the surfaces 38 and 40. The middle channel 22 can be machined to include the through holes 42. The cutouts 54 are vertically aligned with the through holes 42. The through holes 42 are also aligned with mounting locations within the channel piece 22 for accessories. For example, the through holes 42 can be aligned with an audio output area of the speaker 50 when the speaker 50 is mounted in the corresponding accessory mounting location defined by the middle channel piece 22.

When fully installed in the middle channel piece 22, the accessory (e.g., the speaker 50 or 52) is blocked from front access due to the front wall 39, from top access due to the top wall 44, and from bottom access due to the bottom wall 46 and accessory mount 30, 32. In this manner, the middle channel piece 22 can serve to protect accessories from the elements and from vandalism while allowing sound generated by the speaker to easily pass through the front wall 39 to serve the speaker's intended function of providing alerts or other information.

Other types of accessories can be mounted at the accessory mounting locations defined by the middle channel piece 22, such as lights, sirens, and the like (for example, light can pass through the through holes 42). The top wall 44 can include additional holes or cutouts to provide additional accessory mounting locations. Regardless of the type of accessory, the accessory can benefit from being mounted to the push bumper rather than behind the facia of the vehicle, while also benefitting from the physical protection afforded to the accessory by the structure of the middle channel piece 22.

The upper channel assembly 18 and the lower channel 24 can provide additional strength and structural integrity to the push bumper 10. In addition, these channels can mount additional accessories, such as lights and/or reflectors.

To support the modularity of the assembly of the push bumper 10, one or more of the bumper members (e.g., the middle channel piece 22, members of the upper channel assembly 18, the lower channel 24, the accessory mount 32, the accessory mount 30) can include flanges 80 defining openings for receiving fasteners (e.g., fasteners 12) for assembling the push bumper with the fasteners. The flanges 80 can be formed by machining each corresponding frame member (e.g., by bending it) or by attaching flange members to the corresponding frame member.

The description and illustration of one or more embodiments provided in this application are not intended to limit or restrict the scope of the inventions as claimed in any way. The embodiments, examples, and details provided in this application are considered sufficient to convey possession and enable others to make and use the best mode of claimed inventions. The claimed inventions should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed inventions and the general inventive concept embodied in this application that do not depart from the broader scope.

What is claimed is:

1. A push bumper assembly kit for a vehicle, comprising:
   a push bumper having a front and a back, the back of the push bumper being configured to be mounted directly to a chassis or a frame of the vehicle, the push bumper including a channel member, the channel member including a front wall, a top wall extending rearward from a top of the front wall, and a bottom wall extending rearward from a bottom of the front wall, the front wall, the top wall and the bottom wall defining a channel; and
   an accessory mounted in the channel such that access to the accessory from the front of the bumper is blocked by the front wall of the channel member,
   wherein the bottom wall defines an opening for passing the accessory therethrough.

2. The push bumper assembly kit of claim 1, further comprising a member configured to conceal and protect mounting of at least one speaker.

3. The push bumper assembly kit of claim 1, further comprising a member configured to conceal and protect mounting of at least one light.

4. The push bumper assembly kit of claim 1, further comprising:
   bumper members, including at least two uprights and at least one crossbar, at least one of the bumper members being configured to mount directly to the frame or the chassis of the vehicle; and fasteners configured to fasten the bumper members together and to fasten the at least one of the bumper members to the frame or the chassis.

5. The push bumper assembly kit of claim 1, further comprising a plate that supports the accessory and mounts with fasteners to a portion of the channel member to cover the opening.

6. A push bumper assembly for a vehicle, comprising:

a push bumper having a front and a back, the back of the push bumper being configured to be mounted directly to a chassis or a frame of the vehicle, the push bumper including a channel member, the channel member including a front wall, a top wall extending rearward from a top of the front wall, and a bottom wall extending rearward from a bottom of the front wall, the front wall, the top wall and the bottom wall defining a channel; and an accessory mounted in the channel such that access to the accessory from the front of the bumper is blocked by the front wall of the channel member, wherein the bottom wall defines an opening for passing the accessory therethrough.

7. The push bumper assembly of claim 6, wherein the accessory includes a speaker.

8. The push bumper assembly of claim 7, wherein the front wall has a front facing surface and a rear facing surface, and through holes extending through the wall from the front facing surface to the rear facing surface, the through holes being aligned with an audio output area of the speaker.

9. The push bumper assembly of claim 6, further comprising a plate that supports the accessory and mounts with fasteners to a portion of the channel member to cover the opening.

* * * * *